US012706300B2

(12) United States Patent
Yun et al.

(10) Patent No.: US 12,706,300 B2
(45) Date of Patent: Aug. 11, 2026

(54) POSITIVE ACTIVE MATERIAL FOR RECHARGEABLE LITHIUM BATTERY, PREPARING METHOD THEREOF AND RECHARGEABLE LITHIUM BATTERY INCLUDING THE SAME

(71) Applicant: SAMSUNG SDI CO., LTD., Yongin-si (KR)

(72) Inventors: Pilsang Yun, Yongin-si (KR); Hyunbeom Kim, Yongin-si (KR); Sangin Park, Yongin-si (KR); Yongchan You, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 764 days.

(21) Appl. No.: 17/578,220

(22) Filed: Jan. 18, 2022

(65) Prior Publication Data

US 2022/0293913 A1 Sep. 15, 2022

(30) Foreign Application Priority Data

Mar. 12, 2021 (KR) ........................ 10-2021-0032812

(51) Int. Cl.
*H01M 4/36* (2006.01)
*C01G 53/42* (2025.01)
(Continued)

(52) U.S. Cl.
CPC ............ *H01M 4/364* (2013.01); *C01G 53/42* (2013.01); *C01G 53/82* (2025.01); (Continued)

(58) Field of Classification Search
CPC .... H01M 4/364; H01M 4/0471; H01M 4/131; H01M 4/366; H01M 4/505; H01M 4/525; (Continued)

(56) References Cited

U.S. PATENT DOCUMENTS 9,276,259 B2 * 3/2016 Chang .................. H01M 4/485
2012/0217435 A1 8/2012 Yamamoto et al.
(Continued)

FOREIGN PATENT DOCUMENTS

CN 102576869 A 7/2012
CN 104835950 A 8/2015
(Continued)

OTHER PUBLICATIONS

EPO Extended European Search Report dated May 6, 2022, issued in European Patent Application No. 21207251.6, 6 pages.
(Continued)

*Primary Examiner* — Maria Laios
*Assistant Examiner* — Lawrence La Raia, III
(74) *Attorney, Agent, or Firm* — Womble Bond Dickinson (US) LLP

(57) ABSTRACT

A positive active material for a rechargeable lithium battery includes a first positive active material including a secondary particle formed by aggregation of a plurality of primary particles, wherein at least a portion of the primary particles have a radially arranged structure, and a second positive active material including a secondary particle formed by aggregation of a plurality of primary particles, wherein the first positive active material and the second positive active material are both (e.g., simultaneously) nickel-based positive active materials, a particle diameter of the secondary particle of the first positive active material is larger than a particle diameter of the secondary particles\ of the second positive active material, and the second positive active material is coated with a boron compound.

18 Claims, 3 Drawing Sheets

(51) Int. Cl.

| | |
|---|---|
| ***C01G 53/82*** | (2025.01) |
| ***H01M 4/02*** | (2006.01) |
| ***H01M 4/04*** | (2006.01) |
| ***H01M 4/131*** | (2010.01) |
| ***H01M 4/1391*** | (2010.01) |
| ***H01M 4/505*** | (2010.01) |
| ***H01M 4/525*** | (2010.01) |
| ***H01M 4/62*** | (2006.01) |
| ***H01M 10/052*** | (2010.01) |
| ***H01M 10/0525*** | (2010.01) |

(52) U.S. Cl.

CPC ......... *H01M 4/0471* (2013.01); *H01M 4/131* (2013.01); *H01M 4/366* (2013.01); *H01M 4/505* (2013.01); *H01M 4/525* (2013.01); *H01M 4/62* (2013.01); *H01M 2004/021* (2013.01); *H01M 2004/028* (2013.01); *H01M 4/1391* (2013.01); *H01M 10/052* (2013.01); *H01M 10/0525* (2013.01); *H01M 2220/20* (2013.01); *Y02E 60/10* (2013.01)

(58) Field of Classification Search

CPC ....... H01M 10/0525; H01M 2004/021; H01M 2004/028; H01M 4/62; H01M 4/1391; H01M 10/052; H01M 2220/20; C01G 53/006; C01G 53/42; Y02E 60/10

See application file for complete search history.

(56) References Cited

U.S. PATENT DOCUMENTS

| | | | | |
|---|---|---|---|---|
| 2015/0228969 | A1 | 8/2015 | Cho et al. | |
| 2018/0026268 | A1* | 1/2018 | Kim | C01G 53/006 429/223 |
| 2018/0212237 | A1* | 7/2018 | Lee | H01M 10/0525 |
| 2018/0241036 | A1 | 8/2018 | Jo et al. | |
| 2019/0173076 | A1 | 6/2019 | Kim et al. | |
| 2019/0393479 | A1 | 12/2019 | Kim et al. | |
| 2020/0006758 | A1* | 1/2020 | Wi | H01M 4/625 |
| 2020/0028168 | A1 | 1/2020 | Ju et al. | |
| 2020/0127287 | A1 | 4/2020 | Yamauchi et al. | |
| 2020/0185709 | A1* | 6/2020 | Zhou | H01M 4/62 |
| 2020/0185714 | A1 | 6/2020 | Han et al. | |
| 2020/0313180 | A1 | 10/2020 | Ryoshi et al. | |
| 2021/0074998 | A1 | 3/2021 | Yun et al. | |
| 2021/0078868 | A1 | 3/2021 | Eom et al. | |
| 2023/0111400 | A1 | 4/2023 | Lee et al. | |

FOREIGN PATENT DOCUMENTS

| | | | |
|---|---|---|---|
| CN | 107949938 | A | 4/2018 |
| CN | 109997260 | A | 7/2019 |
| CN | 110620216 | A | 12/2019 |
| CN | 111212815 | A | 5/2020 |
| CN | 111226332 | A | 6/2020 |
| EP | 2485305 | A1 | 8/2012 |
| EP | 3514867 | A1 | 7/2019 |
| EP | 3 734 720 | A1 | 11/2020 |
| JP | 2020-102432 | A | 7/2020 |
| KR | 10-2012-0091011 | A | 8/2012 |
| KR | 10-2019-0032248 | A | 3/2019 |
| KR | 10-2019-0065963 | A | 6/2019 |
| KR | 10-2019-0078498 | A | 7/2019 |
| KR | 10-2020-0033354 | A | 3/2020 |
| KR | 10-2020-0041882 | A | 4/2020 |
| KR | 10-2020-0044448 | A | 4/2020 |
| KR | 10-2020-0070649 | A | 6/2020 |
| KR | 10-2020-0090727 | A | 7/2020 |

OTHER PUBLICATIONS

EPO Extended European Search Report dated Jun. 22, 2022, issued in European Patent Application No. 21214895.1, 6 pages.

Korean Office Action dated Aug. 29, 2024, issued in Korean Patent Application No. 10-2021-0013499 (7 pages).

Chinese Office Action, with English translation, dated Jan. 3, 2024, issued in Chinese Patent Application No. 202111551315.1, 14 pages.

Chinese Office Action, with English translation, dated Jan. 4, 2024, issued in Chinese Patent Application No. 202111318837.7, 13 pages.

US Office Action dated Dec. 6, 2023, issued in U.S. Appl. No. 17/454,209 (9 pages).

US Office Action dated Jun. 21, 2024, issued in U.S. Appl. No. 17/454,209 (11 pages).

US Final Office Action dated Mar. 6, 2024, issued in U.S. Appl. No. 17/454,209 (11 pages).

EPO European Office Action dated Apr. 8, 2024, issued in European Patent Application No. 21214895.1 (4 pages).

U.S. Final Office Action for U.S. Appl. No. 17/521,709, dated Mar. 20, 2025, 21 pages.

* cited by examiner

POSITIVE ACTIVE MATERIAL FOR RECHARGEABLE LITHIUM BATTERY, PREPARING METHOD THEREOF AND RECHARGEABLE LITHIUM BATTERY INCLUDING THE SAME

CROSS-REFERENCE TO RELATED APPLICATION

This application claims priority to and the benefit of Korean Patent Application No. 10-2021-0032812 filed in the Korean Intellectual Property Office on Mar. 12, 2021, the entire content of which is incorporated herein by reference.

BACKGROUND

1. Field

One or more aspects of embodiments of the present disclosure relate to a positive active material for a rechargeable lithium battery, a preparing method thereof, and a rechargeable lithium battery including the same.

2. Description of the Related Art

Portable information devices (such as a cell phone, a laptop, smart phone, and/or the like) and an electric vehicle have utilized rechargeable lithium batteries having high energy density and easy portability as a driving power source. Recently, research has been actively conducted on rechargeable lithium batteries with high energy density as a driving power source or power storage power source for hybrid or electric vehicles.

Various positive active materials have been investigated to realize rechargeable lithium batteries for various applications. Among them, lithium nickel-based oxide, lithium nickel manganese cobalt composite oxide, lithium nickel cobalt aluminum composite oxide, lithium cobalt oxide, and/or the like are widely used as positive active materials. However, these positive active materials may have structure collapses or cracks after repeated charges and discharges, and thus problems include long-term deterioration of battery cycle-life, increasing resistance, and unsatisfactory capacity characteristics. Accordingly, development of a novel positive active material securing long-term cycle-life characteristics as well as realizing high capacity and/or high energy density is desired.

SUMMARY

One or more aspects of embodiments of the present disclosure are directed toward a positive active material for a rechargeable lithium battery with improved cycle-life characteristics while implementing a high capacity, a preparing method thereof, and a rechargeable lithium battery including the same.

One or more embodiments of the present disclosure provide a positive active material for a rechargeable lithium battery, the positive active material including a first positive active material including secondary particles in which a plurality of primary particles are aggregated, wherein at least one part of the primary particles has a radially arranged structure, and a second positive active material including secondary particles in which a plurality of primary particles are aggregated, wherein the first positive active material and the second positive active material are both (e.g., simultaneously) nickel-based positive active materials, a particle diameter of the secondary particles of the first positive active material is larger than a particle diameter of the secondary particles of the second positive active material, and the second positive active material is coated with a boron compound.

One or more embodiments of the present disclosure provide a method of preparing a positive active material for a rechargeable lithium battery, the method including: mixing a first nickel metal composite hydroxide and a lithium raw material, and then heat-treating the resultant to prepare a first positive active material, mixing a second nickel metal composite hydroxide, a lithium raw material, and a boron raw material, and then heat-treating the resultant to prepare a second positive active material, and mixing the first positive active material and the second positive active material to obtain the positive active material.

One or more embodiments of the present disclosure provide a rechargeable lithium battery including a positive electrode including the positive active material, a negative electrode, and an electrolyte.

The positive active material for a rechargeable lithium battery manufactured according to an embodiment and a rechargeable lithium battery including the same may exhibit excellent or suitable cycle-life characteristics while realizing a high capacity and high energy density.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
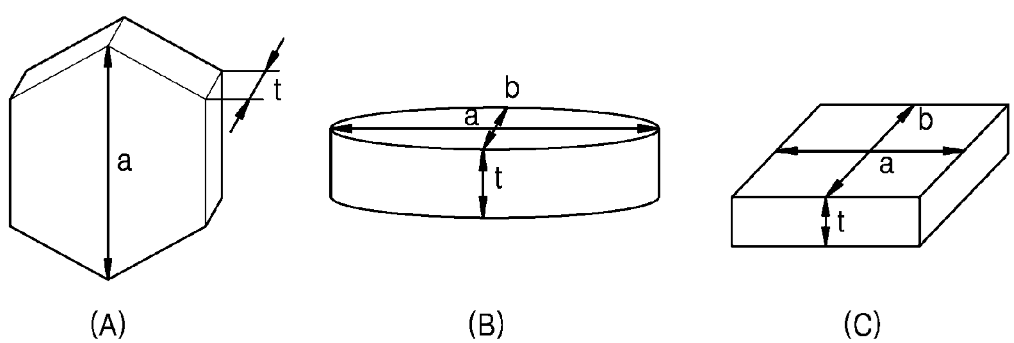
FIG. 1 is a schematic view showing example shapes of a plate-shaped primary particle according to an embodiment.

Hereinafter, selected embodiments will be described in more detail so that those of ordinary skill in the art can easily implement them. However, this disclosure may be embodied in many different forms and should not be construed as being limited to the example embodiments set forth herein.

The terminology used herein is used to describe embodiments only, and is not intended to limit the present disclosure. Singular expressions such as "a," "an," and "the" are intended to include plural expressions as well, unless the context clearly dictates otherwise.

As used herein, the term "combination thereof" refers to a mixture, laminate, composite, copolymer, alloy, blend, reaction product, and/or the like of those constituents.

Herein, it should be understood that terms such as "comprises," "includes," or "have" are intended to designate the presence of an embodied feature, number, step, element, or a combination thereof, but do not preclude the possibility of the presence or addition of one or more other features, numbers, steps, elements, or combinations thereof.

As used herein, the terms "use," "using," and "used" may be considered synonymous with the terms "utilize," "utilizing," and "utilized," respectively. As used herein, expressions such as "at least one of," "one of," and "selected from," when preceding a list of elements, modify the entire list of elements and do not modify the individual elements of the list. As used herein, the term "and/or" includes any and all combinations of one or more of the associated listed items. Further, the use of "may" when describing embodiments of the present disclosure refers to "one or more embodiments of the present disclosure".

In the drawings, the thickness of layers, films, panels, regions, etc., may be exaggerated for clarity, like reference numerals designate like elements throughout the specification, and duplicative descriptions thereof may not be provided. It will be understood that when an element such as a layer, film, region, or substrate is referred to as being "on" another element, it can be directly on the other element or intervening elements may also be present. In contrast, when an element is referred to as being "directly on" another element, there are no intervening elements present.

The term "layer" includes not only a shape formed on the whole surface when viewed from a plan view, but also a shape formed on a partial surface (e.g., a shape or element occupying only part of the surface of an underlying element).

The average particle diameter may be measured via any suitable method in the art, and for example, may be measured by a particle size analyzer, or may be measured by a transmission electron micrograph or a scanning electron micrograph.

An average particle diameter value may be obtained by measuring a particle sample utilizing a dynamic light scattering method, and analyzing the data by counting the number of particles for each particle size range, and calculating a size distribution from this. Unless otherwise defined, the term "average particle diameter" may refer to the diameter (D50) of particles having a cumulative volume of 50 volume % in the particle size distribution.

Positive Active Material

In an embodiment, a positive active material for a rechargeable lithium battery includes: a first positive active material (including secondary particles in which a plurality of primary particles are aggregated (e.g., each secondary particle is formed from an agglomeration of a plurality of primary particles), wherein at least one portion of the primary particles has a radially arranged structure); and a second positive active material (including secondary particles in which a plurality of primary particles are aggregated), wherein the first positive active material and the second positive active material are both (e.g., simultaneously) nickel-based positive active materials, a particle diameter (e.g., an average particle diameter of the secondary particles) of the first positive active material is larger than a particle diameter (e.g., an average particle diameter of the secondary particles) of the second positive active material, and the second positive active material is coated with a boron compound. Such a positive active material may exhibit improved cycle-life characteristics while implementing high capacity and/or high energy density.

First Positive Active Material

The first positive active material includes secondary particles in which at least two or more primary particles are aggregated, and at least a portion of the primary particles may have a radially arranged structure. At least some of the primary particles may have a plate shape. The primary particles may have a thickness that is smaller than a long axis length. Here, the term "long axis length" refers to the maximum length of the widest surface of the primary particle. For example, the primary particle may have a structure in which the length (t) in one axial direction (i.e., thickness direction) is smaller than the long axis length (a) in the other direction (i.e., plane direction).

FIG. 1 is a schematic view showing the shape of primary particles of a first positive active material. Referring to FIG. 1, the primary particles according to an embodiment may have various suitable shapes while having a basic plate structure, for example, (A) a polygonal nanoplate shape (such as a hexagon), (B) a nanodisk shape, and (C) a rectangular parallelepiped shape.

In FIG. 1, "a" refers to the length of the long axis of the primary particle, "b" refers to the length of the short axis, and "t" refers to the thickness of the primary particle. The thickness t of the primary particle may be smaller than the lengths a and b, which are in plane directions. Among the lengths in the plane direction, a may be longer than or equal to b. A thickness t of the primary particle is defined as being in a thickness direction, and lengths a and b are defined as being in plane directions.

The first positive active material may have an irregular porous structure (e.g., irregular pores) in the internal portion and external portion of the secondary particles, respectively. The term "irregular porous structure" refers to a structure having pores that are not regular in pore size and shape and have substantially no uniformity. The internal portion containing the irregular porous structure includes primary particles like the external portion. The primary particles disposed in the internal portion may be arranged without regularity, in contrast to the radial arrangement of primary particles disposed in the external portion.

The term "external portion" may refer to a region within about 30 length % to about 50 length % of the average particle radius from the outermost surface, for example, within about 40 length % from the outermost surface with respect to a total distance from the center to the surface of the secondary particle, or in some embodiments, may refer to a region within about 4 μm from the outermost surface of the secondary particle. The term "internal portion" may refer to a region within about 50 length % to about 70 length % of the average particle radius from the center, for example, within about 60 length % from the center with respect to a total distance from the center to the surface of the secondary particle, or in some embodiments, a region excluding the region within about 4 μm from the outermost surface of the secondary particle.

The secondary particles of the first positive active material may have open pores having a size (e.g., average diameter or length) of less than about 150 nm, for example, about 10 nm to about 148 nm, extending from the surface of the external portion toward the center of the internal portion. Each open pore may be an exposed pore into which an electrolyte solution may flow in and out. The open pores may be formed to an average depth of less than or equal to about 150 nm, for example, about 0.001 nm to about 100 nm, for example, about 1 nm to about 50 nm from the surface of the secondary particles.

Figure 2:
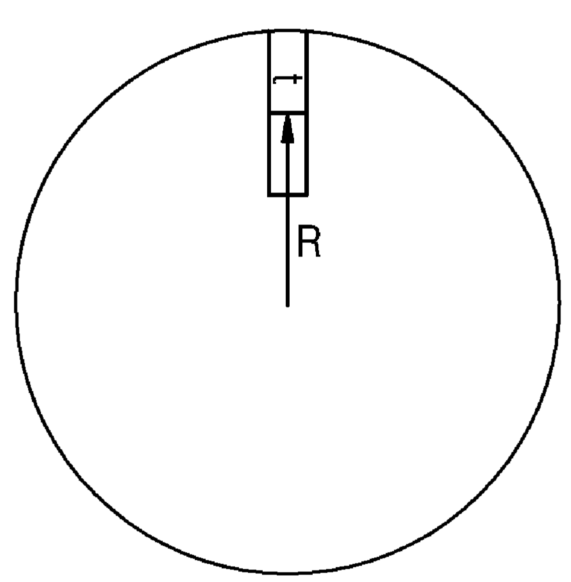
FIG. 2 is a view for explaining the definition of a radial arrangement of primary particles within a secondary particle according to an embodiment.

In the first positive active material, at least one portion (part) of the primary particles may have a radially arranged structure, for example, all or some of the primary particles may be oriented radially, and for example, long axes of the primary particles may be arranged in (along or parallel to) a radial direction. FIG. 2 is a view for explaining the definition of "radially arranged" in a secondary particle according to an embodiment. As shown in FIG. 2, when a particle is radially arranged, the thickness (t) direction of the primary particles is perpendicular (normal) to or within an angle of about ±5° of perpendicular to the direction (R) extending toward a surface from a center of the secondary particle. For example, the secondary particle may include an internal part and an external part, and the primary particles both (e.g., simultaneously) in the internal part and the external part may be radially oriented, or in some embodiments, only the primary particles in the external part may be radially oriented. As another example, the secondary particle may include an external part in which the primary particles are radially oriented and an internal part in which the primary particles are irregularly arranged (e.g., are randomly or non-regularly oriented).

The average length of the primary particles of the secondary particle may be about 0.01 μm to about 5 μm. For example, the average length may be about 0.01 μm to about 2 μm, about 0.01 μm to about 1 μm, about 0.02 μm to about 1 μm, or about 0.05 μm to about 0.5 μm. Here, "average length" refers to the average length of the long axis length (a) in the plane direction when the primary particles are plate-shaped, and when the primary particle is spherical, it refers to the average particle diameter.

When the primary particles are plate-shaped, an average thickness of the primary particles may be, for example, greater than or equal to about 50 nm, greater than or equal to about 100 nm, greater than or equal to about 200 nm, greater than or equal to about 300 nm, greater than or equal to about 400 nm, greater than or equal to about 500 nm, greater than or equal to about 600 nm, greater than or equal to about 700 nm, greater than or equal to about 800 nm, or greater than or equal to about 900 nm, and for example, less than or equal to about 5 μm, less than or equal to about 4 μm, less than or equal to about 3 μm, less than or equal to about 2 μm, less than or equal to about 1 μm, less than or equal to about 900 nm, less than or equal to about 800 nm, less than or equal to about 700 nm, less than or equal to about 600 nm, or less than or equal to about 500 nm, for example, about 100 nm to about 200 nm. In some embodiments, a ratio of the average thickness to the average length in the primary particles may be about 1:1 to about 1:10, for example about 1:1 to about 1:8, for example, about 1:1 to about 1:6.

As described above, when the average length, the average thickness, and the ratio between the average thickness and the average length of the primary particles each satisfy the above ranges, and when the primary particles are radially arranged, it is possible to have a relatively large number of lithium diffusion pathways between grain boundaries exposed on the outer surface, and a large number of crystal planes capable of lithium transfer are also exposed to the outer surface, so that lithium diffusion is improved and/or high initial efficiency and/or capacity can be secured. When the primary particles are arranged radially, the pores exposed on the outer surface are directed toward the center of the secondary particles, thereby promoting diffusion of lithium. Due to the radially arranged primary particles, substantially uniform contraction and expansion may be possible when lithium is deintercalated and/or intercalated, and when lithium is intercalated, the primary particles may expand into pores existing within the secondary particle along the (001) direction, so that the pores can act as a buffer. Due to the size (and/or shape) and arrangement of the primary particles, the probability of cracks occurring during contraction and expansion of the active material may be lowered, and the internal pores may further alleviate the volume change to reduce the cracks generated between the primary particles during charging and discharging, resulting in improved cycle-life characteristics and reduced resistance increase.

Closed pores may be present in the internal portion of the secondary particle, and closed pores and/or open pores may exist in the external portion. The closed pores may exclude or mostly exclude electrolyte, while the open pores may include electrolyte therein (e.g., allow electrolyte ingress). The closed pores are independent pores that are not connected to other pores because all of the walls of the pores are formed in a closed structure, and the open pores are substantially continuous pores connected to the outside of the particle because at least some of the walls of the pores are formed in an open structure.

When the positive active material according to an embodiment includes the first positive active material, even when cracks occur, direct contact between the cracked surface and the electrolyte may be minimized or reduced, thereby suppressing an increase in surface resistance.

Figure 3:
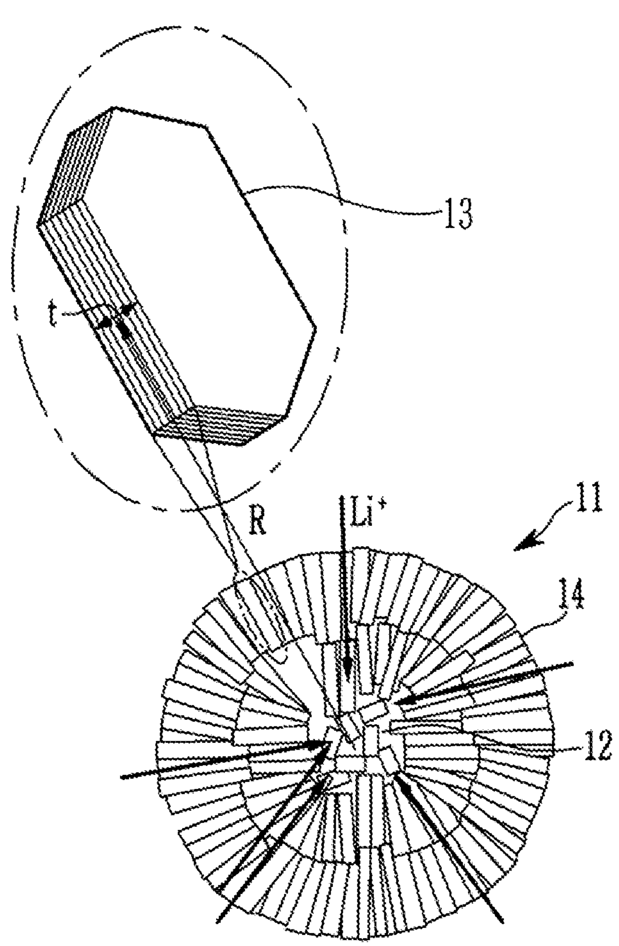
FIG. 3 is a schematic view showing a cross-sectional structure of a secondary particle according to an embodiment.

FIG. 3 is a schematic view illustrating a cross-sectional structure of a secondary particle 11 of a first positive active material. Referring to FIG. 3, the secondary particle 11 of the first positive active material according to an embodiment has an external portion 14 having a structure in which the primary particles 13 having a plate shape are arranged in a radial direction, and an internal portion 12 in which the primary particles 13 are irregularly arranged. The internal portion 12 may have more empty spaces between the primary particles (e.g., may be packed less densely) than the external portion. In some embodiments, the pore size and porosity in the internal portion may be large and irregular compared with the pore size and porosity in the external portion. In FIG. 3, arrows indicate the movement direction of lithium ions.

In the secondary particle, the internal portion has a porous structure, so that the effective diffusion distance of lithium ions to the internal portion may be reduced, and the external portion is radially arranged toward the surface, so that lithium ions may be easily intercalated into the surface. Because the size of the primary particles is small, it may be easy to secure a lithium transfer path between crystal grains. Because the size of the primary particles is small and the pores between the primary particles alleviate the volume change occurring during charging and discharging, the stress caused by the volume change during charging and discharging may be minimized or reduced.

Moreover, in the secondary particle, the plurality of primary particles may have a radial arrangement structure by being arranged toward the "single (1) center" (e.g., a single center) so that they make surface contact along the thickness direction of the primary particles. In some embodiments, the secondary particles may each have a "multi-center" radial arrangement structure having a plurality of centers. When the secondary particles each have a single-center or multi-center radial arrangement structure, lithium may be easily deintercalated and/or intercalated to the center of the secondary particles.

The secondary particles may include radially arranged primary particles and non-radially arranged primary particles. The content (e.g., amount) of the non-radially arranged primary particles may be less than or equal to about 20 wt %, for example about 0.01 wt % to about 10 wt %, or about 0.1 wt % to about 5 wt %, based on 100 parts by weight (e.g., 100 wt %) of the total weight of the radially arranged primary particles and the non-radially arranged primary particles. When non-radially arranged primary particles are included in addition to the radially arranged primary particles in the secondary particles in the above-described content range, a rechargeable lithium battery with improved cycle-life characteristics may be provided by facilitating the diffusion of lithium.

The average particle diameter of the secondary particles of the first positive active material may be about 7 μm to about 25 μm. For example, it may be about 10 μm to about 25 μm, about 15 μm to about 25 μm, or about 10 μm to about 20 μm. The average particle diameter of the secondary particles of the first positive active material may be larger than the average particle diameter of the secondary particles of the second positive active material, which will be described later. The positive active material according to an embodiment is a mixture of a first positive active material that is large particles (e.g., with a relatively large average particle diameter), and a second positive active material that is small particles (e.g., with a relatively small average particle diameter), thereby providing improved mixture density, high capacity, and high energy density.

The first positive active material may include a lithium nickel composite oxide as a nickel-based positive active material. The nickel content (e.g., amount) in the lithium nickel composite oxide may be greater than or equal to about 30 mol %, for example, greater than or equal to about 40 mol %, greater than or equal to about 50 mol %, greater than or equal to about 60 mol %, greater than or equal to about 70 mol %, greater than or equal to about 80 mol %, or greater than or equal to about 90 mol %, and less than or equal to about 99.9 mol %, or less than or equal to about 99 mol % based on the total amount of metals other than lithium. For example, the nickel content (e.g., amount) in the lithium nickel composite oxide may be higher than the content (e.g., amount) of each of the other metals (e.g., cobalt, manganese, and aluminum). When the nickel content (e.g., amount) satisfies the above range, the positive active material may exhibit excellent or suitable battery performance while realizing a high capacity.

For example, the first positive active material may include a compound represented by Chemical Formula 1:

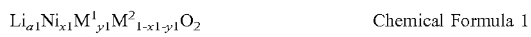

$Li_{a1}Ni_{x1}M^1_{y1}M^2_{1-x1-y1}O_2$ Chemical Formula 1

In Chemical Formula 1, $0.9 \leq a1 \leq 1.8$, $0.3 \leq x1 \leq 1$, $0 \leq y1 \leq 0.7$, and $M^1$ and $M^2$ may each independently be selected from aluminum (Al), boron (B), barium (Ba), calcium (Ca), cerium (Ce), cobalt (Co), chromium (Cr), copper (Cu), fluorine (F), iron (F), magnesium (Mg), manganese (Mn), molybdenum (Mo), niobium (Nb), phosphorus (P), sulfur (S), silicon (Si), strontium (Sr), titanium (Ti), vanadium (V), tungsten (W), zirconium (Zr), and combinations thereof.

The first positive active material may include, for example, a compound of Chemical Formula 2.

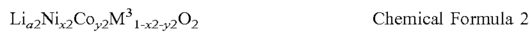

$Li_{a2}Ni_{x2}Co_{y2}M^3_{1-x2-y2}O_2$ Chemical Formula 2

In Chemical Formula 2, $0.9 \leq a2 \leq 1.8$, $0.3 \leq x2 < 1$, $0 < y2 \leq 0.7$, and $M^3$ may be selected from Al, B, Ba, Ca, Ce, Cr, Cu, F, Fe, Mg, Mn, Mo, Nb, P, S, Si, Sr, Ti, V, W, Zr, and combinations thereof.

The first positive active material may include, for example, a compound of Chemical Formula 3.

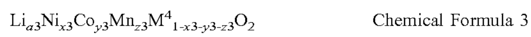

$Li_{a3}Ni_{x3}Co_{y3}Mn_{z3}M^4_{1-x3-y3-z3}O_2$ Chemical Formula 3

In Chemical Formula 3, $0.9 \leq a3 \leq 1.8$, $0.3 \leq x3 < 1$, $0 < y3 < 0.7$, $0 < z2 < 0.4$, and $M^4$ is selected from Al, B, Ba, Ca, Ce, Cr, Cu, F, Fe, Mg, Mo, Nb, P, S, Si, Sr, Ti, V, W, Zr, and combinations thereof.

In the positive active material according to an embodiment, the first positive active material may be included in an amount of about 50 wt % to about 90 wt %, and the second positive active material may be included in an amount of about 10 wt % to about 50 wt % based on the total amount of the first positive active material and the second positive active material. The first positive active material may be, for example, included in an amount of about 60 wt % to about 90 wt %, or about 70 wt % to about 90 wt %, and the second positive active material may be for example included in an amount of about 10 wt % to about 40 wt %, or about 10 wt % to about 30 wt %. When the content (e.g., amount) ratio of the first positive active material and the second positive active material is as described above, the positive active material including the same may exhibit high capacity, improved mixture density, and high energy density.

Second Positive Active Material

The second positive active material is a nickel-based active material, includes secondary particles in which a plurality of primary particles are aggregated, has a size (e.g., average particle diameter) smaller than that of the first positive active material, and is coated with a boron compound. The positive active material according to the embodiment may exhibit improved cycle-life characteristics while implementing high capacity and/or high energy density by including the second positive active material.

The coating content of the boron compound may be less than or equal to 3.0 mol %, for example, about 0.1 mol % to about 3 mol %, about 0.1 mol % to about 2.5 mol %, about 0.1 mol % to about 2 mol %, about 0.1 mol % to about 1.5 mol %, about 0.1 mol % to about 1.3 mol %, or about 0.5 mol % to about 1.3 mol % based on 100 mol % of the second positive active material. When the coating content of the boron compound is as described, the initial discharge capacity and/or cycle-life characteristics may increase.

Here, the boron compound may include, for example, boron oxide, lithium boron oxide, or a combination thereof, and may include, for example $B_2O_2$, $B_2O_3$, $B_4O_3$, $B_4O_5$, $LiBO_2$, $Li_2B_4O_7$, $Li_3BO_3$, or a combination thereof.

The second positive active material may include a first boron coating portion present on the surface (e.g., outermost surface) of the secondary particles, and a second boron coating portion present on the surface(s) of the primary particles inside the secondary particles. The first boron coating portion and the second boron coating portion may include the boron compound described above.

The second boron coating portion may be present in the internal portion rather than at the outer surface of the secondary particle, and for example may be coated along interfaces of the primary particles inside the secondary particle, and for example may be expressed as being coated at the grain boundaries. It is conventionally understood that boron is not mixed in the interior of the primary particles due to its particle size (e.g., the boron content substantially does not diffuse into the primary particles), but is coated (e.g., is present as a coating) on (e.g., over) the surface(s) of the primary particles. Here, the term "internal portion" of the secondary particle refers to the entire interior except for the area exposed at the outermost surface or outer region of the secondary particle, and for example, may refer to the entire interior from a depth of approximately 2 μm from the outer surface (e.g., the region of the secondary particle that is contained outside a 2 μm thick shell region at the outer surface). It can also be described as the portions or regions of the secondary particles of the positive active material that do not come into contact with effluent when the secondary particles are washed with distilled water.

In the case of coating boron on the positive active material in the related art, it is common to utilize a method of heat-treating a boron raw material that is applied by wet or dry mixing after preparing a lithium metal composite oxide.

However, in this case, boron acts as (e.g., can contribute to) a resistance on the surface of the positive active material and may thereby deteriorate capacity and cycle-life. In contrast, when the lithium source and a boron raw material are added to the nickel metal composite hydroxide (which is a precursor of the positive active material) and heat-treated to obtain a positive active material according to embodiments of the present disclosure, boron is coated on the surface of the positive active material as well as on internal grain boundaries. When an appropriate or suitable amount of boron is coated the grain boundary inside the positive active material (e.g., inside the secondary particle) and on the surface of the positive active material (e.g., also on the outer surface of the secondary particle) at the same time (e.g., simultaneously), boron no longer acts as a resistance, structural stability of the positive active material may be ensured, initial discharge capacity of the battery does not decrease (e.g., may be maintained), and cycle-life characteristics may be improved.

According to one embodiment, the weight of the first boron coating portion may be greater than the weight of the second boron coating portion. For example, the second boron coating portion may be included in an amount of about 2 wt % to about 30 wt %, about 2 wt % to about 20 wt %, about 2 wt % to about 15 wt %, about 2 wt % to about 10 wt %, or about 5 wt % to about 20 wt %, and the first boron coating portion may be included in an amount of about 70 wt % to about 98 wt %, about 80 wt % to about 98 wt %, about 85 wt % to about 98 wt %, about 90 wt % to about 98 wt %, or about 80 wt % to about 95 wt %, each based on the total (e.g., combined) amount of the first boron coating portion and the second boron coating portion. For example, the weight ratio of the first boron coating portion to the second boron coating portion may be about 70:30 to about 98:2, for example, about 80:20 to about 95:5. When the content (e.g., amount) ratio of the first boron coating portion and the second boron coating portion is as described, boron does not act as a resistance in the positive active material and may serve to improve performance, and the positive active material including such a boron coating portion may exhibit improved cycle-life characteristics while implementing a high capacity.

The content (e.g., amount) of the first boron coating portion may be, for example, about 0.02 wt % to about 0.3 wt %, about 0.03 wt % to about 0.3 wt %, or about 0.05 wt % to about 0.2 wt % based on the total weight of the second positive active material. The content (e.g., amount) of the second boron coating portion may be, for example, about 0.001 wt % to about 0.05 wt %, about 0.001 wt % to about 0.04 wt %, about 0.001 wt % to about 0.03 wt %, about 0.003 wt % to about 0.02 wt %, or about 0.001 wt % to about 0.01 wt % based on the positive active material, but is not limited thereto. When the contents of the first boron coating portion and the second boron coating portion based on the positive active material is as described above, boron may not act as a resistance in the second positive active material, and the positive active material including the same may exhibit high capacity and excellent or suitable cycle-life characteristics.

A total amount of the first boron coating portion and the second boron coating portion may be about 0.1 mol % to about 3 mol %, for example about 0.1 mol % to about 2.5 mol %, about 0.1 mol % to about 2 mol %, about 0.1 mol % to about 1.5 mol %, about 0.1 mol % to about 1.3 mol %, or about 0.5 mol % to about 1.3 mol % based on 100 mol % of the second positive active material. When the total amount of the first boron coating portion and the second boron coating portion is outside of these ranges, the initial discharge capacity may decrease and cycle-life characteristics may be deteriorated. For example, when the content (e.g., amount) of the first boron coating on the surface of the secondary particles of the second positive active material is excessive, the initial discharge capacity may be greatly reduced as boron acts as a resistance.

The second positive active material may have a radially arranged structure, similar to the first positive active material. For example, the second positive active material may include a secondary particle in which at least one part (portion) of the constituting primary particles are in a radially arranged structure. For example, all or some of the primary particles may be arranged radially. For example, in the second positive active material, the secondary particles may include (e.g., each include) an internal portion having an irregular porous structure and an external portion having a radially arranged structure. The primary particles may have a plate shape, and the average length of the primary particles may be about 0.01 μm to about 2 μm, for example, about 0.01 μm to about 1 μm, or about 0.05 μm to about 0.5 μm. The average thickness of the primary particles may be about 50 nm to about 2 μm, for example, about 50 nm to about 1 μm, or about 100 nm to about 500 nm. Because the radially arranged structure is the same as described in the first positive active material part, a detailed description thereof will not be provided.

The average particle diameter of the secondary particles of the second positive active material may be about 1 μm to about 9 μm. For example, it may be about 2 μm to about 9 μm, about 2 μm to about 8 μm, or about 3 μm to about 7 μm.

The average particle diameter of the secondary particles of the second positive active material may be smaller than the average particle diameter of the secondary particles of the first positive active material. Accordingly, the positive active material according to an embodiment is a mixture of a first positive active material having relatively large particles, and a second positive active material having relatively small particles, thereby improving the density of the mixture, and implementing a high capacity and a high energy density.

The second positive active material may include a lithium nickel-based composite oxide as a nickel-based active material. The nickel content (e.g., amount) in the lithium nickel composite oxide may be greater than or equal to about 30 mol %, for example greater than or equal to about 40 mol %, greater than or equal to about 50 mol %, greater than or equal to about 60 mol %, greater than or equal to about 70 mol %, greater than or equal to about 80 mol %, or greater than or equal to about 90 mol %, and less than or equal to about 99.9 mol %, or less than or equal to about 99 mol % based on the total amount of metals other than lithium. For example, the nickel content (e.g., amount) in the lithium nickel composite oxide may be higher than the content (e.g., amount) of each of the other metals (e.g., cobalt, manganese, and aluminum). When the nickel content (e.g., amount) satisfies the above range, the positive active material may exhibit excellent or suitable battery performance while realizing a high capacity.

As the nickel content (e.g., amount) in the positive active material is increased, cation mixing (in which $Ni^{2+}$ ions take lithium sites) may also increase, and capacity may resultingly decrease, and because diffusion of lithium ions is hindered by impurities (such as NiO and/or the like), and the positive active material may undergo side reaction(s) with electrolyte due to structural collapse and cracks formed during charge and discharge, the battery may have decreased cycle-life and safety problems. When boron is coated only on the surface of an active material in the related art in an attempt to solve such problems, the boron may act as resistance and may significantly decrease capacity and deteriorate cycle-life. In contrast, the second positive active material according to an embodiment is coated with boron in an appropriate or suitable amount on the surface and in the inner grain boundaries, and may accordingly realize high capacity and concurrently (e.g., simultaneously), improve cycle-life characteristics without deteriorating initial discharge capacity, even when a material having a high concentration of nickel is used.

The second positive active material may be, for example, represented by Chemical Formula 11.

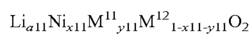

$Li_{a11}Ni_{x11}M^{11}_{y11}M^{12}_{1-x11-y11}O_2$  Chemical Formula 11

In Chemical Formula 11, $0.9 \leq a11 \leq 1.8$, $0.3 \leq x11 \leq 1$, $0 \leq y1 \leq 0.7$, and $M^{11}$ and $M^{12}$ may each independently be selected from Al, B, Ba, Ca, Ce, Co, Cr, Cu, F, Fe, Mg, Mn, Mo, Nb, P, S, Si, Sr, Ti, V, W, Zr, and combinations thereof.

In Chemical Formula 11, x11 representing the nickel content (e.g., amount) may be, for example, $0.4 \leq x11 < 1$, $0.5 \leq x11 < 1$, $0.6 \leq x11 < 1$, $0.8 \leq x11 < 1$, or $0.9 \leq x11 < 1$. In this case, the positive active material may implement a high capacity.

The second positive active material may be, for example, represented by Chemical Formula 12 or Chemical Formula 13.

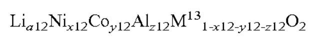

$Li_{a12}Ni_{x12}Co_{y12}Al_{z12}M^{13}_{1-x12-y12-z12}O_2$  Chemical Formula 12

In Chemical Formula 12, $0.9 \leq a12 \leq 1.8$, $0.3 \leq x12 < 1$, $0 < y12 < 0.7$, $0 < z12 < 0.7$, and $M^{13}$ may be selected from B, Ba, Ca, Ce, Cr, Cu, F, Fe, Mg, Mn, Mo, Nb, P, S, Si, Sr, Ti, V, W, Zr, and combinations thereof.

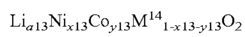

$Li_{a13}Ni_{x13}Co_{y13}M^{14}_{1-x13-y13}O_2$  Chemical Formula 13

In Chemical Formula 13, $0.9 \leq a13 \leq 1.8$, $0.3 \leq x13 < 1$, $0 < y13 \leq 0.7$, and $M^{14}$ may be selected from B, Ba, Ca, Ce, Cr, Cu, F, Fe, Mg, Mn, Mo, Nb, P, S, Si, Sr, Ti, V, W, Zr, and combinations thereof.

When the second positive active material includes the compound represented by Chemical Formula 2 or Chemical Formula 3, the effect of improving battery performance according to the first boron coating portion and the second boron coating portion may be higher, that is, while implementing a high capacity, the initial discharge capacity is not lowered, and the effect of improving cycle-life characteristics can be obtained.

In Chemical Formula 12, x12, y12, and z12 may be, for example, in the range: $0.5 \leq x12 < 1$, $0 < y12 < 0.5$, and $0 < z12 < 0.5$, $0.6 \leq x12 < 1$, $0 < y12 < 0.4$, and $0 < z12 < 0.4$, or $0.8 \leq x12 < 1$, $0 < y12 < 0.2$, and $0 < z12 < 0.2$. In Chemical Formula 13, x13 and y13 may be, for example, in the range: $0.5 \leq x13 < 1$ and $0 < y13 \leq 0.5$, $0.6 \leq x13 < 1$ and $0 < y13 \leq 0.4$, or $0.8 \leq x13 \leq 0.99$, $0.01 \leq y13 \leq 0.2$.

Method of Preparing Positive Active Material

In an embodiment, a method of preparing a positive active material for a rechargeable lithium battery includes: mixing a first nickel metal composite hydroxide and a lithium raw material, and heat-treating the resultant to prepare a first positive active material, mixing a second nickel metal composite hydroxide, a lithium raw material, and a boron raw material, and heat-treating the resultant to prepare a second positive active material, and mixing the first positive active material and the second positive active material. Through the method, the above-described positive active material may be obtained.

In the preparing method, the particle diameter (e.g., the average particle diameter) of the first nickel metal composite hydroxide may be larger than that of the second nickel metal composite hydroxide. The particle diameter of the first nickel metal composite hydroxide may be about 10 μm to about 30 μm, for example, about 10 μm to about 25 μm, about 15 μm to about 25 μm, or about 10 μm to about 20 μm. The particle diameter of the second nickel metal composite hydroxide may be about 1 μm to about 9 μm, for example, about 2 μm to about 9 μm, about 2 μm to about 8 μm, or about 3 μm to about 7 μm.

The first nickel metal composite hydroxide and the second nickel metal composite hydroxide may each independently be represented by Chemical Formula 21.

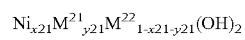

$Ni_{x21}M^{21}_{y21}M^{22}_{1-x21-y21}(OH)_2$  Chemical Formula 21

In Chemical Formula 21, $0.3 \leq x21 \leq 1$, $0 \leq y21 \leq 0.7$, and $M^{21}$ and $M^{22}$ may each independently be selected from Al, B, Ba, Ca, Ce, Co, Cr, Cu, F, Fe, Mg, Mn, Mo, Nb, P, S, Si, Sr, Ti, V, W, Zr, and combinations thereof.

In the preparing method, the lithium raw material may be for example $Li_2CO_3$, LiOH, a hydrate thereof, or a combination thereof. The lithium raw material may be utilized in a ratio (e.g., amount) of about 0.8 mole to about 1.8 mole, for example about 0.8 mole to about 1.2 mole based on 1 mole of the first nickel metal composite hydroxide or the second nickel metal composite hydroxide.

In the preparing of the first positive active material, the heat treatment of the mixture may be performed under an oxidizing gas atmosphere, and may be performed at a temperature of about 650° C. to about 850° C., or about 670° C. to about 750° C., for about 5 hours to about 15 hours, for example, about 8 hours to about 12 hours.

The preparing of the second positive active material may include preparing a second positive active material in which a boron compound is coated on a nickel-based active material of secondary particles in which a plurality of primary particles are aggregated.

In the related art, when boron is coated on a positive active material, a lithium raw material is commonly mixed with a nickel metal composite hydroxide followed by heat-treating the resultant to prepare a lithium nickel-based composite oxide, and a boron source is mixed therewith by a wet or dry method followed by performing heat-treatment again. In this case, only the surface of the positive active material is coated with boron, and thus boron acts as a resistance, thereby reducing capacity and cycle-life. In contrast, by mixing the second nickel metal composite hydroxide, lithium raw material, and boron raw material and performing heat-treatment, a positive active material coated with boron not only on the surface of the positive active material but also on grain boundaries inside the positive active material according to an embodiment may be obtained.

The boron raw material may be a compound containing boron, for example, $H_3BO_3$, $B_2O_3$, $C_6H_5B(OH)_2$, $(C_6H_5O)_3B$, $[CH_3(CH_2)_3O]_3B$, $(C_3H_7O)_3B$, $C_3H_9B_3O_6$, $C_{13}H_{19}BO_3$, or any combination thereof. The content (e.g., amount) of the boron raw material may be about 0.1 mol % to about 3 mol %, for example about 0.1 mol % to about 2.5 mol %, about 0.1 mol % to about 2 mol %, about 0.1 mol % to about 1.5 mol %, or about 0.5 mol % to about 1.3 mol % based on 100 mol % of the second nickel metal composite hydroxide. When the content (e.g., amount) of boron raw material satisfies the above range, boron does not act as a resistance in the positive active material and may serve to improve battery performance, thereby improving battery capacity and improving cycle-life characteristics. When the content (e.g., amount) of the boron raw material is excessive, the content (e.g., amount) of the first boron coating portion is excessively increased, and boron acts as a resistance in the positive active material, thereby reducing the capacity and cycle-life of the battery.

In the preparing of the second positive active material, the heat treatment of the mixture may be performed under an oxidizing gas atmosphere, for example, at a temperature of about 650° C. to about 850° C., or about 690° C. to about 780° C. In some embodiments, the heat-treatment of the mixture may be performed for about 5 hours to about to 25 hours, for example, about 8 hours to about 12 hours. In this case, a second positive active material having a stable structure including both (e.g., simultaneously) the first boron coating portion and the second boron coating portion is prepared.

The mixing of the first positive active material and the second positive active material may include mixing about 50 wt % to about 90 wt % of the first positive active material and about 10 wt % to about 50 wt % of the second positive active material. The first positive active material may be mixed in an amount of, for example, about 60 wt % to about 90 wt %, or about 70 wt % to about 90 wt %, and the second positive active material may be mixed in an amount of, for example, about 10 wt % to about 40 wt %, or about 10 wt % to about 30 wt %. When the mixing ratio of the first positive active material and the second positive active material is as described above, the manufactured rechargeable lithium battery may realize a high capacity, a mixture density may be improved, and a high energy density may be exhibited.

Positive Electrode

A positive electrode for a rechargeable lithium battery may include a current collector and a positive active material layer on the current collector. The positive active material layer may include a positive active material, and may further include a binder and/or a conductive material.

The binder improves the binding properties of positive active material particles with one another and with a current collector. Examples thereof may be or include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

The content (e.g., amount) of the binder in the positive active material layer may be about 1 wt % to about 5 wt % based on the total weight of the positive active material layer.

The conductive material is included to provide or increase electrode conductivity. Any electrically conductive material may be utilized as a conductive material unless it causes an unwanted chemical change. Examples of the conductive material may include a carbon-based material (such as natural graphite, artificial graphite, carbon black, acetylene black, ketjen black, a carbon fiber, and/or the like); a metal-based material of a metal powder or a metal fiber including copper, nickel, aluminum, silver, and/or the like; a conductive polymer (such as a polyphenylene derivative); and mixtures thereof.

The content (e.g., amount) of the conductive material in the positive active material layer may be about 1 wt % to about 5 wt % based on the total weight of the positive active material layer.

An aluminum foil may be utilized as the current collector, but is not limited thereto.

Negative Electrode

A negative electrode for a rechargeable lithium battery includes a current collector and a negative active material layer on the current collector. The negative active material layer may include a negative active material, and may further include a binder and/or a conductive material.

The negative active material may include a material that reversibly intercalates/deintercalates lithium ions, a lithium metal, a lithium metal alloy, a material capable of doping/dedoping lithium, or a transition metal oxide.

The material that reversibly intercalates/deintercalates lithium ions may include, for example crystalline carbon and/or amorphous carbon as a carbon-based negative active material. The crystalline carbon may be non-shaped (e.g., carbon not having a particular or set shape), and/or sheet, flake, spherical, and/or fiber shaped natural graphite and/or artificial graphite. The amorphous carbon may be a soft carbon, a hard carbon, a mesophase pitch carbonization product, calcined coke, and/or the like.

The lithium metal alloy may be an alloy including lithium and one or more metals selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The material capable of doping/dedoping lithium may be a Si-based negative active material or a Sn-based negative active material. The Si-based negative active material may include silicon, a silicon-carbon composite, $SiO_x$ ($0<x<2$), a Si-Q alloy (wherein Q is an alkali metal, an alkaline-earth metal, a Group 13 element, a Group 14 element excluding Si, a Group 15 element, a Group 16 element, a transition metal, a rare earth element, or any combination thereof) and the Sn-based negative active material may include Sn, $SnO_2$, Sn—R alloy (wherein R is an alkali metal, an alkaline-earth metal, a Group 13 element, a Group 14 element excluding Sn, a Group 15 element, a Group 16 element, a transition metal, a rare earth element, or any combination thereof). At least one of these materials may be mixed with $SiO_2$. The elements Q and R may each independently be selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), and a combination thereof.

The silicon-carbon composite may be, for example, a silicon-carbon composite including a core including crystalline carbon and silicon particles and an amorphous carbon coating layer disposed on the surface of the core. The crystalline carbon may be artificial graphite, natural graphite, or a combination thereof. The amorphous carbon precursor may be or include a coal-based pitch, mesophase pitch, petroleum-based pitch, coal-based oil, petroleum-based heavy oil, and/or a polymer resin (such as a phenol resin, a furan resin, or a polyimide resin). In this case, the content (e.g., amount) of silicon may be about 10 wt % to about 50 wt % based on the total weight of the silicon-carbon composite. In some embodiments, the content (e.g., amount) of the crystalline carbon may be about 10 wt % to about 70 wt % based on the total weight of the silicon-carbon composite, and the content (e.g., amount) of the amorphous carbon may be about 20 wt % to about 40 wt % based on the total weight of the silicon-carbon composite. In some embodiments, a thickness of the amorphous carbon coating layer may be about 5 nm to about 100 nm. An average particle diameter (D50) of the silicon particles may be about 10 nm to about 20 μm. The average particle diameter (D50) of the silicon particles may be about 10 nm to about 200 nm. The silicon particles may exist in an oxidized form, and in this case, an atomic ratio of Si:O in the silicon particles (indicating a degree of oxidation) may be about 99:1 to about 33:67. The silicon particles may be $SiO_x$ particles, and in this case, the range of x in $SiO_x$ may be greater than about 0 and less than about 2.

The Si-based negative active material or Sn-based negative active material may be mixed with the carbon-based negative active material. When the Si-based negative active material or Sn-based negative active material and the carbon-based negative active material are mixed and utilized, the mixing ratio may be a weight ratio of about 1:99 to about 90:10.

In the negative active material layer, the negative active material may be included in an amount of about 95 wt % to about 99 wt % based on the total weight of the negative active material layer.

In an embodiment, the negative active material layer further includes a binder, and may optionally further include a conductive material. The content (e.g., amount) of the binder in the negative active material layer may be about 1 wt % to about 5 wt % based on the total weight of the negative active material layer. In some embodiments, when the conductive material is further included, the negative active material layer may include about 90 wt % to about 98 wt % of the negative active material, about 1 wt % to about 5 wt % of the binder, and about 1 wt % to about 5 wt % of the conductive material.

The binder may aid in adhering the negative active material particles to each other and to the current collector. The binder may be a water-insoluble binder, a water-soluble binder, or a combination thereof.

Examples of the water-insoluble binder may be or include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoroethylene, polyvinylidene fluoride, polyethylene, polypropylene, polyamideimide, polyimide, and combinations thereof.

The water-soluble binder may include a rubber binder and/or a polymer resin binder. The rubber binder may be selected from a styrene-butadiene rubber, an acrylated styrene-butadiene rubber, an acrylonitrile-butadiene rubber, an acrylic rubber, a butyl rubber, a fluororubber, and combinations thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and combinations thereof.

When a water-soluble binder is utilized as the negative electrode binder, a cellulose-based compound capable of imparting viscosity may be further included. As the cellulose-based compound, one or more of carboxymethyl cellulose, hydroxypropylmethyl cellulose, methyl cellulose, or alkali metal salts thereof may be mixed and utilized. As the alkali metal, Na, K, and/or Li may be utilized. The amount of the thickener utilized may be about 0.1 parts by weight to about 3 parts by weight based on 100 parts by weight of the negative active material.

The conductive material may provide increased electrode conductivity. Any electrically conductive material may be utilized as a conductive material unless it causes an unwanted chemical change. Examples of the conductive material may include a carbon-based material (such as natural graphite, artificial graphite, carbon black, acetylene black, ketjen black, a carbon fiber, and/or the like); a metal-based material of a metal powder or a metal fiber including copper, nickel, aluminum silver, and/or the like; a conductive polymer (such as a polyphenylene derivative); and mixtures thereof.

The current collector may include one selected from a copper foil, a nickel foil, a stainless steel foil, a titanium foil, a nickel foam, a copper foam, a polymer substrate coated with a conductive metal, and combinations thereof.

Rechargeable Lithium Battery

Another embodiment provides a rechargeable lithium battery including a positive electrode, a negative electrode, a separator between the positive electrode and the positive electrode, and an electrolyte impregnated in the electrodes and separator. Here, the aforementioned electrode may be the positive electrode and negative electrode.

Figure 4:
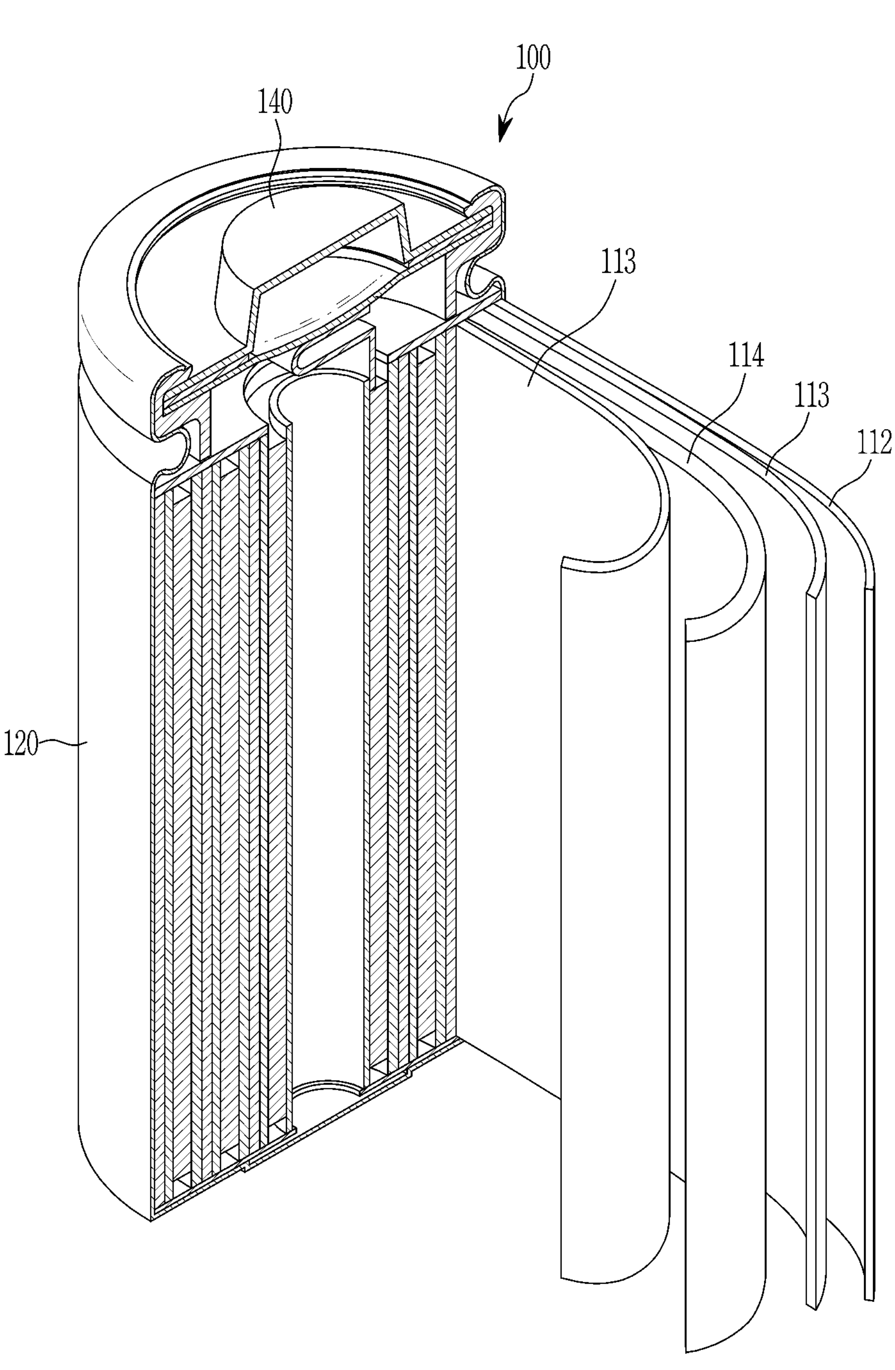
FIG. 4 is a schematic view illustrating a rechargeable lithium battery according to an embodiment.

FIG. 4 is a schematic view illustrating a rechargeable lithium battery according to an embodiment. Referring to FIG. 4, a rechargeable lithium battery 100 according to an embodiment of the present disclosure includes a battery cell including a positive electrode 114, a negative electrode 112 facing the positive electrode 114, a separator 113 between the positive electrode 114 and the negative electrode 112, and an electrolyte for a rechargeable lithium battery impregnating the positive electrode 114, negative electrode 112, and separator 113, a battery case 120 housing the battery cell, and a sealing member 140 sealing the battery case 120.

The electrolyte includes a non-aqueous organic solvent and a lithium salt.

The non-aqueous organic solvent serves as a medium for transmitting ions taking part in the electrochemical reaction of a battery. The non-aqueous organic solvent may be or include a carbonate-based, ester-based, ether-based, ketone-based, or alcohol-based solvent, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. Examples of the ester-based solvent may include methyl acetate, ethyl acetate, n-propyl acetate, dimethyl acetate, methyl propionate, ethyl propionate, γ-butyrolactone, decanolide, valerolactone, mevalonolactone, caprolactone, and/or the like. The ether-based solvent may be or include dibutyl ether, tetraglyme, diglyme, dimethoxyethane, 2-methyltetrahydrofuran, tetrahydrofuran, and/or the like, and the ketone-based solvent may be cyclohexanone, and/or the like. In some embodiments, the alcohol-based solvent may be ethyl alcohol, isopropyl alcohol, etc. and the aprotic solvent may be or include nitriles (such as R—CN, where R is a C2 to C20 linear, branched, or cyclic hydrocarbon group and may include a double bond, an aromatic ring, and/or an ether bond), amides (such as dimethylformamide), dioxolanes (such as 1,3-dioxolane), sulfolanes, and/or the like.

The non-aqueous organic solvent may be utilized alone or in a mixture. When the organic solvent is utilized in a mixture, the mixture ratio may be controlled or selected in accordance with a desirable battery performance.

In some embodiments, in the case of the carbonate-based solvent, a mixture of a cyclic carbonate and a chain carbonate may be utilized. In this case, when the cyclic carbonate and the chain carbonate are mixed in a volume ratio of about 1:1 to about 1:9, the electrolyte may exhibit excellent or suitable performance.

The non-aqueous organic solvent may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

The aromatic hydrocarbon-based solvent may be an aromatic hydrocarbon-based compound represented by Chemical Formula I.

Chemical Formula I

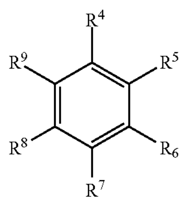

In Chemical Formula I, $R^4$ to $R^9$ may be the same or different and may be selected from hydrogen, a halogen, a C1 to C10 alkyl group, a haloalkyl group, and combinations thereof.

Examples of the aromatic hydrocarbon-based solvent may be or include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The electrolyte may further include vinylene carbonate and/or an ethylene carbonate-based compound represented by Chemical Formula II in order to improve battery cycle-life.

Chemical Formula II

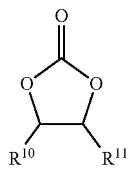

In Chemical Formula II, $R^{10}$ and $R^{11}$ may be the same or different, and selected from hydrogen, a halogen, a cyano group, a nitro group, and fluorinated C1 to C5 alkyl group, provided that at least one selected from $R^{10}$ and $R^{11}$ is a halogen, a cyano group, a nitro group, or fluorinated C1 to C5 alkyl group, and $R^{10}$ and $R^{11}$ are not concurrently (e.g., simultaneously) hydrogen.

Examples of the ethylene-based carbonate-based compound may be or include difluoroethylene carbonate, chloroethylene carbonate, dichloroethylene carbonate, bromoethylene carbonate, dibromoethylene carbonate, nitroethylene carbonate, cyanoethylene carbonate, and/or fluoroethylene carbonate. The amount of the additive for improving cycle-life may be within an appropriate or suitable range.

The lithium salt dissolved in the non-organic solvent supplies lithium ions in a battery, enables basic operation of a rechargeable lithium battery, and improves transportation of the lithium ions between positive and negative electrodes.

Examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide), LiFSI), $LiC_4F_9SO_3$, $LiClO_4$, $LiAlO_2$, $LiAlCl_4$, $LiPO_2F_2$, $LiN(C_xF_{2x+1}SO_2)(CyF_{2y+1}SO_2)$, wherein x and y are natural numbers, for example, an integer in a range selected from 1 to 20, lithium difluoro(bis(oxolato)) phosphate, LiCl, LiI, $LiB(C_2O_4)_2$ (lithium bis(oxalato) borate): LiBOB), and lithium difluoro (oxalato)borate (LiDFOB).

The lithium salt may be utilized in a concentration ranging from about 0.1 M to about 2.0 M. When the lithium salt is included at the above concentration range, an electrolyte may have excellent or suitable performance and lithium ion mobility due to optimal or suitable electrolyte conductivity and viscosity.

The separator 113 separates the positive electrode 114 and the negative electrode 112, provides a transporting passage for lithium ions, and may be any generally-utilized separator in a lithium ion battery. For example, the separator may have low resistance to ion transport and/or excellent or suitable electrolyte impregnation. For example, the separator may be selected from a glass fiber, polyester, Teflon, polyethylene, polypropylene, polytetrafluoroethylene, and combinations thereof. It may have a form of a non-woven fabric or a woven fabric. For example, in a lithium ion battery, a polyolefin-based polymer separator (such as polyethylene and/or polypropylene) is mainly utilized. In order to ensure the heat resistance or mechanical strength, a coated separator including a ceramic component or a polymer material may be utilized. Optionally, the separator may have a mono-layered or multi-layered structure.

Rechargeable lithium batteries may be classified as lithium ion batteries, lithium ion polymer batteries, or lithium polymer batteries according to the presence of a separator and the type or kind of electrolyte utilized therein. The rechargeable lithium batteries may have a variety of shapes and sizes, and may be cylindrical, prismatic, coin, and/or pouch-type or format batteries, and may be thin film batteries or may be rather bulky in size. Suitable structures and manufacturing methods for lithium ion batteries pertaining to this disclosure are well known in the art.

The rechargeable lithium battery according to an embodiment may be utilized in an electric vehicle (EV) and/or a hybrid electric vehicle (such as a plug-in hybrid electric vehicle (PHEV)) because it implements a high capacity and has excellent or suitable storage stability, cycle-life characteristics, and high rate characteristics at high temperatures.

Hereinafter, examples of the present disclosure and comparative examples are described. It is to be understood, however, that the examples are for the purpose of illustration and are not to be construed as limiting the present disclosure.

Example 1

1. Preparation of First Positive Active Material Precursor

First, a first nickel metal composite hydroxide ($Ni_{0.945}Co_{0.04}Al_{0.015}OH$), which is a precursor of a first positive active material, is synthesized through a co-precipitation method, which will be described later. Here, nickel sulfate, cobalt sulfate, and aluminum nitrate are utilized as metal raw materials.

First Step (Task): 2.5 kW/$m^3$, $NH_4OH$ 0.40 M, pH 10.5 to 11.5, and Reaction Time of 6 Hours First, ammonia water having a concentration of 0.40 M is put in a reactor. Metal raw materials and a complex agent are added thereto respectively at 85 mL/min and 10 mL/min at 50° C. under a stirring power of 2.5 kW/$m^3$, and a reaction is started. While adding NaOH thereto to maintain pH, the reaction is performed for 6 hours. The core particles obtained as a reaction result had an average size of about 6.5 μm to 7.5 μm, and a second step was performed as follows.

Second Step (Task): 2.0 kW/$m^3$, $NH_4OH$ 0.45 M, pH 11 to 12, and Reaction Time of 18 Hours Metal raw materials and the complex agent are added thereto respectively at 85 mL/min and 12 mL/min, while the reaction temperature is maintained at 50° C., so that the complex agent maintained a concentration of 0.45 M. While adding NaOH thereto in order to maintain pH, the reaction is performed for 18 hours. Herein, the reaction is performed by lowering the stirring power by 2.0 kW/$m^3$ than that of the first step. Particles having a core and an intermediate layer produced from this reaction had an average size of 13.5 μm to 14 μm, and a third step was performed as follows.

Third Step (Task): 1.5 kW/$m^3$, $NH_4OH$ 0.45 M, pH 10.5 to 11.5, and Reaction Time of 14 Hours While maintaining the reaction temperature of 50° C., the input rate of the metal raw material and the complexing agent and the concentration of the complexing agent are the same as in second step. While adding NaOH thereto in order to maintain pH, the reaction is performed for 14 hours. At this time, the stirring power is lowered to 1.5 kW/$m^3$, which is lower than the second step, and the reaction proceeds.

Post Process

After washing the obtained product, hot air drying is performed at about 150° C. for 24 hours to obtain a first nickel metal composite hydroxide ($Ni_{0.945}Co_{0.04}Al_{0.015}OH$).

2. Preparation of First Positive Active Material

A first positive active material ($LiNi_{0.945}Co_{0.04}Al_{0.015}O_2$) is obtained by mixing the obtained first nickel metal composite hydroxide and LiOH in a mole ratio of 1:1 and performing a first heat-treatment at about 700° C. for 10 hours in an oxygen atmosphere. The average particle diameter of the obtained first positive active material is about 13.8 μm.

3. Preparation of Second Positive Active Material Precursor

First, ammonia water having a concentration of 0.25 M is put in a reactor. While a metal raw materials and a complex agent are added thereto respectively at 142 mL/min and 34 mL/min at 50° C. under a stirring power of 3.0 kW/$m^3$, a reaction is started. Here, nickel sulfate, cobalt sulfate, and aluminum nitrate are utilized as metal raw materials. While adding NaOH thereto to maintain pH, the reaction is performed for 30 hours. As a result of the reaction, the reaction is terminated when the average size of the obtained core particles reaches 4 μm. After washing the obtained product, it is dried with hot air at about 150° C. for 24 hours to obtain a second nickel metal composite hydroxide ($Ni_{0.945}Co_{0.04}Al_{0.015}(OH)_2$), which is a precursor of a second positive active material.

4. Preparation of Second Positive Active Material

The obtained second nickel metal composite hydroxide and LiOH are mixed in a mole ratio of 1:1, 0.5 mol % of boric acid based on the positive active material precursor is mixed, and heat-treatment at 725° C. is performed in an oxygen atmosphere for 10 hours, to obtain a lithium nickel-based composite oxide ($LiNi_{0.945}Co_{0.04}Al_{0.015}O_2$) coated with a boron compound on the inner grain boundary and on the surface.

6. Manufacture of Positive Electrode 95 wt % of a positive active material obtained by mixing the obtained first positive active material and second positive active material in a weight ratio of 70:30, 3 wt % of a polyvinylidene fluoride binder, and 2 wt % of a ketjen black conductive material are mixed in an N-methylpyrrolidone solvent to prepare a positive active material slurry. The positive active material slurry is applied to an aluminum current collector, dried, and then compressed to manufacture a positive electrode.

7. Manufacture of Rechargeable Lithium Battery Cell

A coin half-cell is manufactured by disposing a separator having a polyethylene/polypropylene multilayer structure between the manufactured positive electrode and lithium metal counter electrode, and injecting an electrolyte solution in which 1.0 M $LiPF_6$ lithium salt was added to ethylene carbonate and diethyl carbonate mixed in a volume ratio of 50:50.

Example 2

A positive active material, a positive electrode, and a battery cell are manufactured in substantially the same manner as in Example 1, except that 1.0 mol % of boric acid is added in the preparation of the second positive active material.

Example 3

A positive active material, a positive electrode, and a battery cell are manufactured in substantially the same manner as in Example 1, except that 1.5 mol % of boric acid is added in the preparation of the second positive active material.

Example 4

A positive active material, a positive electrode, and a battery cell are manufactured in substantially the same manner as in Example 1, except that 3.0 mol % of boric acid is added in the preparation of the second positive active material.

Comparative Example 1

A positive active material, a positive electrode, and a battery cell are manufactured in substantially the same manner as in Example 1, except that boric acid is not added in the preparation of the second positive active material.

Comparative Example 2

A positive active material, a positive electrode, and a battery cell are manufactured in substantially the same manner as in Example 1, except that a positive active material ($LiNi_{0.945}Co_{0.04}Al_{0.015}O_2$) composed of general secondary particles having a particle diameter of about 14 μm is utilized instead of the first positive active material according to Example 1.

Comparative Example 3

After preparing a second positive active material without adding boric acid as in Comparative Example 1, a boron compound is coated on the second positive active material via a related art method. For example, the second positive active material of Comparative Example 1 is mixed with 0.5 mol % of boric acid and then, heat-treated at 350° C. under an oxygen atmosphere for 8 hours, thereby obtaining a nickel-based metal composite oxide ($LiNi_{0.945}Co_{0.04}Al_{0.015}O_2$) coated with the boron compound on the surface (e.g., outermost surface). A positive electrode and a battery cell are manufactured in substantially the same manner as Example 1, except that this nickel-based metal composite oxide ($LiNi_{0.945}Co_{0.04}Al_{0.015}O_2$) coated with the boron compound on the surface is utilized as a second positive active material.

Comparative Example 4

A positive active material, a positive electrode, and a battery cell are manufactured in substantially the same manner as in Example 1, except that 5.0 mol % of boric acid is added to prepare the second positive active material in Example 1.

Evaluation Example 1: Evaluation of Boron Content in Inner Grain Boundary of Second Positive Active Material The second positive active materials according to Examples 1 to 4 and Comparative Examples 1 to 4 were measured with respect to a boron content (e.g., amount) through an ICP light emission spectroscopic analysis. 10 g of each positive active material is added to 100 g of distilled water, and then stirred for 30 minutes and filtered to isolate the positive active material. Through this washing process, boron on the surface (e.g., outermost surface) of the positive active material is all removed. The recovered positive active material is dried at 130° C. for 24 hours and then, measured with respect to boron content (e.g., amount) through an ICP light emission spectroscopic analysis, and this boron content is that present in the internal portion of the positive active material, that is, on the grain boundaries. The difference obtained by subtracting the boron content after the washing from the boron content before the washing, (that is, a boron content removed through the washing) is taken to be the boron content on the surface of the positive active material. In Table 1, ppm is a unit based on weight, and 1 ppm is $10^{-4}$ wt %. Here, "ND" indicates "not detected", e.g., a boron amount below the detection threshold.

TABLE 1

| | Addition amount of boron (mol %) | Boron content at the grain boundary (ppm) | Boron content on the surface (ppm) |
|---|---|---|---|
| Example 1 | 0.5 | 30 | 510 |
| Example 2 | 1.0 | 50 | 1050 |
| Example 3 | 1.5 | 130 | 1400 |
| Example 4 | 3.0 | 120 | 2550 |
| Comparative Example 1 | 0 | ND | ND |
| Comparative Example 2 | 0.5 | 30 | 510 |
| Comparative Example 3 | 0.5 | ND | 1020 |
| Comparative Example 4 | 5.0 | 130 | 3930 |

Referring to Table 1, in the second positive active material of Comparative Example 1 in which the boron coating does not proceed, boron is not present at (e.g., is not detected at) the grain boundaries nor on the surface, and in Comparative Example 3 in which the boron coating proceeds in a related art coating method, there is no boron remaining after the washing, that is, the boron is not coated to inner grain boundaries of the active material but on the surface. In contrast, in the active materials of Examples 1 to 4, even after all boron on the surfaces is removed during the washing of the active materials, the boron is present, that is, detected as being coated on inner grain boundaries of the active materials (which are not reached by distilled water).

Evaluation Example 2: Evaluation of Cell Performance

The coin half-cells according to Examples 1 to 4 and Comparative Examples 1 to 3 are charged at a constant current of 0.2 C to an upper limit voltage of 4.25 V and discharged at 0.2 C down to a discharge cut-off voltage of 3.0 V at 25° C. and then, measured with respect to initial discharge capacity, wherein a ratio of discharge capacity relative to charge capacity is calculated as efficiency. The coin half-cells are additionally charged at a constant current of 1 C up to an upper limit voltage of 4.3 V and discharged at 1 C down to a discharge cut-off voltage of 3.0 V at 45° C. and then, measured with respect to initial discharge capacity and also, continuously 50 times charged and discharged and then measured with respect to discharge capacity at the $50^{th}$ cycle, evaluating capacity retention.

TABLE 2

| | First positive active material | Addition amount of boron of second positive active material (mol %) | Initial discharge capacity (mAh/g) | Initial charge and discharge efficiency (%) | $50^{th}$ cycle capacity retention (%) |
|---|---|---|---|---|---|
| Example 1 | Prepared in Example 1 | 0.5 | 218 | 90 | 91 |
| Example 2 | Same as above | 1.0 | 215 | 89 | 92 |
| Example 3 | Same as above | 1.5 | 214 | 88 | 88 |

TABLE 2-continued

| | First positive active material | Addition amount of boron of second positive active material (mol %) | Initial discharge capacity (mAh/g) | Initial charge and discharge efficiency (%) | $50^{th}$ cycle capacity retention (%) |
|---|---|---|---|---|---|
| Example 4 | Same as above | 3.0 | 212 | 88 | 89 |
| Comparative Example 1 | Same as above | 0 | 215 | 90 | 85 |
| Comparative Example 2 | General secondary particle | 0.5 | 210 | 89 | 63 |
| Comparative Example 3 | Same as Example 1 | 0.5 Related art coating method | 208 | 88 | 90 |
| Comparative Example 4 | Same as Example 1 | 5.0 | 187 | 90 | 84 |

Referring to Table 2, Comparative Example 1, in which the boron coating does not proceed on the second positive active material, exhibits low $50^{th}$ cycle capacity retention, and Comparative Example 2, in which the active material has the same composition as that of the first positive active material of Example 1 but a general art secondary particle shape, exhibit greatly low initial discharge capacity and capacity retention. Comparative Example 3, in which the boron coating proceeds only on the surface of the second positive active material, exhibit lower discharge capacity than the examples, in which the boron coating proceeds in substantially the same amount. The reason is that a boron compound coated only on the surface of an active material acts as resistance. Comparative Example 4, in which the boron coating proceeds in an excess of 5.0 mol %, exhibits greatly low initial discharge capacity and capacity retention. Here, because the first boron coating on the surface is excessive, the boron acts as resistance (e.g., contributes to cell resistance).

In contrast, Examples 1 to 4 all exhibit improved discharge capacity, initial charge and discharge efficiency, and capacity retention.

As used herein, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this present disclosure has been described in connection with what is presently considered to be practical example embodiments, it is to be understood that the disclosure is not limited to the disclosed embodiments. In contrast, it is intended to cover various modifications and equivalent arrangements included within the spirit and scope of the appended claims and equivalents thereof.

| Description of Some of the Symbols | |
|---|---|
| 11: | secondary particle |
| 12: | internal portion of secondary particle |
| 13: | primary particle |
| 14: | external portion of secondary particle |
| 100: | rechargeable lithium battery |
| 112: | positive electrode |
| 113: | separator |
| 114: | positive electrode |
| 120: | battery case |
| 140: | sealing member |

What is claimed is:

1. A positive active material for a rechargeable lithium battery, the positive active material comprising:

a first positive active material comprising a secondary particle in which a plurality of primary particles are aggregated, wherein at least one portion of the primary particles aggregated in the secondary particle has a radially arranged structure, and a second positive active material comprising a secondary particle in which a plurality of primary particles are aggregated, wherein, the first positive active material and the second positive active material are both nickel-based positive active materials, a particle diameter of the secondary particle of the first positive active material is larger than a particle diameter of the secondary particle of the second positive active material, and the second positive active material is coated with a boron compound, the second positive active material comprising:

a first boron coating portion on an outer surface of the secondary particle, and a second boron coating portion present on surfaces of the primary particles inside the secondary particle, and the second boron coating portion is in an internal portion of the secondary particle that is inaccessible by effluent if washed with water, wherein the first boron coating portion is about 70 wt % to about 98 wt % and the second boron coating portion is about 2 wt % to about 30 wt %, each based on a total amount of the first boron coating portion and the second boron coating portion.

2. The positive active material of claim 1, wherein in the first positive active material, the primary particles are plate-shaped primary particles, and at least some of the plate-shaped primary particles have a long axis arranged in a radial direction.

3. The positive active material of claim 2, wherein an average length of the plate-shaped primary particles in the first positive active material is about 0.01 μm to about 5 μm.

4. The positive active material of claim 1, wherein:

the particle diameter of the secondary particle of the first positive active material is about 7 μm to about 25 μm, and the particle diameter of the secondary particle of the second positive active material is about 1 μm to about 9 μm.

5. The positive active material of claim 1, wherein the first positive active material comprises a compound represented by Chemical Formula 1:

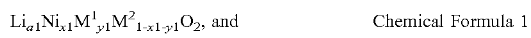

$Li_{a1}Ni_{x1}M^1_{y1}M^2_{1-x1-y1}O_2$, and  Chemical Formula 1 wherein, in Chemical Formula 1, $0.9 \leq a1 \leq 1.8$, $0.3 \leq x1 \leq 1$, $0 \leq y1 \leq 0.7$, and $M^1$ and $M^2$ are each independently selected from Al, B, Ba, Ca, Ce, Co, Cr, Cu, F, Fe, Mg, Mn, Mo, Nb, P, S, Si, Sr, Ti, V, W, Zr, and a combination thereof.

6. The positive active material of claim 1, wherein the first positive active material is about 50 wt % to 90 wt % and the second positive active material is about 10 wt % to about 50 wt %, each based on a total amount of the first positive active material and the second positive active material.

7. The positive active material of claim 1, wherein the first boron coating portion and the second boron coating portion each comprise boron oxide, lithium boron oxide, or a combination thereof.

8. The positive active material of claim 1, wherein the first boron coating portion is about 80 wt % to about 95 wt % and the second boron coating portion is about 5 wt % to about 20 wt %, each based on the total amount of the first boron coating portion and the second boron coating portion.

9. The positive active material of claim 1, wherein the first boron coating portion is about 0.02 wt % to about 0.3 wt % based on 100 wt % of the second positive active material.

10. The positive active material of claim 1, wherein the second boron coating portion is about 0.001 wt % to about 0.05 wt % based on 100 wt % of the second positive active material.

11. The positive active material of claim 1, wherein the second boron coating portion is about 0.001 wt % to about 0.01 wt % based on 100 wt % of the second positive active material.

12. The positive active material of claim 1, wherein a total amount of the first boron coating portion and the second boron coating portion is about 0.1 mol % to about 3 mol % based on 100 mol % of the second positive active material.

13. The positive active material of claim 12, wherein the total amount of the first boron coating portion and the second boron coating portion is about 0.1 mol % to about 1.3 mol % based on 100 mol % of the second positive active material.

14. The positive active material of claim 1, wherein the second positive active material comprises a compound represented by Chemical Formula 11:

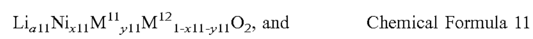

$Li_{a11}Ni_{x11}M^{11}_{y11}M^{12}_{1-x11-y11}O_2$, and  Chemical Formula 11 wherein, in Chemical Formula 11, $0.9 \leq a11 \leq 1.8$, $0.3 \leq x11 \leq 1$, $0 \leq y11 \leq 0.7$, and $M^{11}$ and $M^{12}$ are each independently selected from Al, B, Ba, Ca, Ce, Co, Cr, Cu, F, Fe, Mg, Mn, Mo, Nb, P, S, Si, Sr, Ti, V, W, Zr, and a combination thereof.

15. A method of preparing the positive active material of claim 1, the method comprising:

mixing a first nickel metal composite hydroxide and a lithium raw material, and heat-treating the resultant to prepare a first positive active material, mixing a second nickel metal composite hydroxide, a lithium raw material, and a boron raw material, and heat-treating the resultant to prepare a second positive active material, and mixing the first positive active material and the second positive active material.

16. The method of claim 15, wherein a content of the boron raw material is about 0.1 mol % to about 3 mol % based on 100 mol % of the second nickel metal composite hydroxide.

17. The method of claim 15, wherein after the mixing of the second nickel metal composite hydroxide, the lithium raw material, and the boron raw material, the heat-treating of the resultant is performed at a temperature of about 650° C. to about 850° C. for about 5 hours to about 25 hours.

18. A rechargeable lithium battery comprising:

a positive electrode comprising the positive active material of claim 1, a negative electrode, and an electrolyte.

* * * * *